(12) United States Patent
Yamasaki et al.

(10) Patent No.: US 10,031,377 B2
(45) Date of Patent: Jul. 24, 2018

(54) NOZZLE HEAD AND LIQUID DISPENSING DEVICE

(71) Applicant: Sakai Display Products Corporation, Sakai-shi, Osaka (JP)

(72) Inventors: Kazuyuki Yamasaki, Sakai (JP); Hiroaki Tokunaga, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 6 days.

(21) Appl. No.: 14/895,386

(22) PCT Filed: Jun. 10, 2014

(86) PCT No.: PCT/JP2014/065356
§ 371 (c)(1),
(2) Date: Dec. 2, 2015

(87) PCT Pub. No.: WO2014/203768
PCT Pub. Date: Dec. 24, 2014

(65) Prior Publication Data
US 2016/0103347 A1    Apr. 14, 2016

(30) Foreign Application Priority Data
Jun. 20, 2013 (JP) ................................. 2013-129693

(51) Int. Cl.
*G02F 1/1341*    (2006.01)
*B05B 1/30*    (2006.01)
(Continued)

(52) U.S. Cl.
CPC ........... *G02F 1/1341* (2013.01); *B05B 1/3013* (2013.01); *B05B 12/004* (2013.01); *B05B 15/60* (2018.02); *G02F 2001/13415* (2013.01)

(58) Field of Classification Search
CPC ... G02F 1/1341; B05B 1/3013; B05B 12/004; B05B 15/06
(Continued)

(56) References Cited

U.S. PATENT DOCUMENTS

| 2,755,137 | A | * | 7/1956 | Hughf | ..................... B05B 1/048 |
|-----------|---|---|--------|-------|---------------------------|
| | | | | | 239/288.5 |
| 3,033,470 | A | * | 5/1962 | Choitz | ..................... A62C 2/08 |
| | | | | | 239/207 |
| 4,334,637 | A | * | 6/1982 | Baker | ..................... B05B 1/00 |
| | | | | | 219/230 |

(Continued)

FOREIGN PATENT DOCUMENTS

| CN | 101542371 A | 9/2009 |
|----|-------------|--------|
| JP | H06-154682 A | 6/1994 |

(Continued)

*Primary Examiner* — Chee-Chong Lee
(74) *Attorney, Agent, or Firm* — Rudy J. Ng; Bret E. Field; Bozicevic, Field & Francis LLP (57) ABSTRACT

The circumferential part of an opening of an ejection part included in a nozzle head is formed in the shape of a convex curved plane. A liquid crystal droplet adhered to the portion with the shape of a convex curved plane of the ejection part smoothly flows down along the outer surface of the ejection part and is adhered to the opening end of the opening. The liquid crystal droplet adhered to the opening end of the opening is absorbed into the liquid crystal droplet to be ejected through the opening and is dispensed downward together with the liquid crystal droplet. This suppresses a large liquid crystal pool being formed on the outer surface of the ejection part. As a result, such problems that liquid crystal to be dispensed is absorbed into a liquid crystal pool while not being dispensed downward and that a large amount of liquid crystal is unnecessarily dispensed from a liquid crystal pool are both be suppressed. In other words, liquid crystal may appropriately be dispensed.

7 Claims, 6 Drawing Sheets

(51) Int. Cl.
*B05B 12/00* (2018.01)
*B05B 15/60* (2018.01)

(58) Field of Classification Search
USPC .......................................... 239/584
See application file for complete search history.

(56) References Cited

U.S. PATENT DOCUMENTS

| | | | | |
|---|---|---|---|---|
| 4,346,849 A | * | 8/1982 | Rood | B05B 1/00 239/597 |
| 4,349,947 A | * | 9/1982 | Rood | B05B 1/00 228/136 |
| 4,880,663 A | * | 11/1989 | Shimada | B05B 1/04 427/207.1 |
| 4,982,896 A | * | 1/1991 | Crow | B05B 1/044 239/11 |
| 4,993,637 A | * | 2/1991 | Kanesaka | F02M 47/027 239/533.4 |
| 5,288,027 A | * | 2/1994 | Herstek | B05B 1/042 239/594 |
| 2002/0102323 A1 | | 8/2002 | Ihara et al. | |
| 2013/0033545 A1 | | 2/2013 | Nakahashi et al. | |

FOREIGN PATENT DOCUMENTS

| | | |
|---|---|---|
| JP | H08-025415 A | 1/1996 |
| JP | 2002-225084 A | 8/2002 |
| JP | 2006-51424 A | 2/2006 |
| JP | 2008-23471 A | 2/2008 |
| JP | 2008-181061 A | 8/2008 |
| JP | 2013-31948 A | 2/2013 |

\* cited by examiner

NOZZLE HEAD AND LIQUID DISPENSING DEVICE

CROSS-REFERENCE TO RELATED APPLICATIONS

This application is the national phase under 35 U. S. C. § 371 of PCT International Application No. PCT/JP2014/065356 which has an International filing date of Jun. 10, 2014 and designated the United States of America.

FIELD

The present invention relates to a nozzle head ejecting liquid and a liquid dispensing device which dispenses liquid.

BACKGROUND

A liquid crystal dispensing device is used in a case where liquid crystal is dispensed to a glass substrate so as to manufacture a liquid crystal display panel, for example. A nozzle head is attached to the liquid crystal dispensing device. The nozzle head is provided with an ejection part. The ejection part is formed in a tubular shape arranged in a vertical posture. Liquid crystal is ejected from an opening at a lower end surface of the ejection part. The ejected liquid crystal is dispensed to a glass substrate located below the ejection part.

Conventionally, a nozzle head has been proposed which prevents such a phenomenon that liquid crystal unnecessarily flows out from an ejection part (see Japanese Patent Application Laid-Open Publication No. 2002-225084, which is hereinafter referred to as Patent Document 1). In the nozzle head according to Patent Document 1 ("injection-molding nozzle for resin with high temperature dependency of viscosity" in the text), a flow path through which liquid crystal flows has a specific shape in order to prevent unnecessary outflow (so-called drooling) due to a change in temperature of liquid crystal.

SUMMARY

It is to be noted that the separation distance between the ejection part of the nozzle head and the glass substrate is short, while the ejection speed from the ejection part is high. Thus, a part of liquid crystal dispensed to the glass substrate may sometimes be splashed back to the ejection part and adhered to the outer surface of the ejection part. The amount of liquid crystal adhered to the outer surface of the ejection part by one dispensing is very small. However, over multiple times of liquid dispensing, the liquid crystal is repeatedly splashed, resulting in gradual increase in the adhered amount of liquid crystal. Moreover, drops of the adhered liquid crystal are bonded together. As a result, a large liquid crystal pool is formed on the outer surface of the ejection part.

The circumferential surface of the ejection part has the shape of a cylindrical plane in a vertical posture, a tapered plane or the like. The liquid crystal splashed back to the circumferential surface of the ejection part is adhered to the circumferential surface of the ejection part or flows down to the lower end surface along the circumferential surface of the ejection part.

The lower end surface of the ejection part has the shape of a flat plane in a horizontal posture. To the lower end surface of the ejection part, liquid crystal splashed back to the lower end surface of the ejection part or liquid crystal flowed down along the circumferential surface of the ejection part is adhered. Therefore, a liquid crystal pool is easily formed on the lower end surface of the ejection part.

When a liquid crystal pool is formed on the lower end surface of the ejection part, liquid crystal ejected from the opening at the lower end surface of the ejection part may be absorbed into the liquid crystal pool. That is, the liquid crystal ejected from the opening at the lower end surface of the ejection part may not be dispensed to the glass substrate (hereinafter referred to as "dispense inhibition").

Furthermore, a large amount of liquid crystal may unnecessarily be dispensed from the liquid crystal pool to the glass substrate (so-called dripping).

The dispense inhibition causes manufacturing defects due to insufficient liquid crystal to be dispensed to the glass substrate. The dripping causes manufacturing defects due to excessive liquid crystal to be dispensed to the glass substrate. It is, therefore, desired to suppress both dispense inhibition and dripping. Patent Document 1, however, discloses no technical features for suppressing dispense inhibition or dripping caused by splashing of liquid crystal.

The present invention has been made in view of the circumstances described above, and has a main object of providing a nozzle head and a liquid dispensing device that can appropriately dispense liquid.

In a nozzle head according to the present invention comprising a flow passage part provided with a first flow path through which fed liquid flows and an ejection part provided with a second flow path through which liquid passed through the first flow path flows and an opening at a lower stream side of the second flow path, an circumferential part of the opening is formed in a shape of a convex curved plane.

In the nozzle head according to the present invention, the ejection part is formed in a shape of a hemisphere protruding from the flow passage part, and the opening is formed at a top part of the hemisphere.

In a liquid dispensing device according to the present invention dispensing liquid ejected from the nozzle head according to the present invention, the flow passage part of the nozzle head is detachably attached with a posture in which the opening of the nozzle head faces downward and liquid is fed to the first flow path of the flow passage part to cause liquid ejected through the opening to be dispensed.

The liquid dispensing device according to the present invention further comprises a detection part detecting liquid ejected from an ejection part of the nozzle head and a support part supporting the flow passage part at a lower side through a spacer. In the liquid dispensing device, the ejection part is formed at and protrudes from the flow passage part.

According to the present invention, the nozzle head is attached to the liquid dispensing device with the opening of the ejection part facing downward. At the outer surface of the ejection part of the nozzle head, the circumferential part of the opening of the ejection part is formed in the shape of a convex curved plane. The liquid splashed back to the portion of the convex curved plane on the outer surface of the ejection part smoothly flows down along this portion and is adhered to the opening end of the opening of the ejection part. The liquid adhered to the opening end is, when liquid is ejected through the opening, dispensed downward together with the ejected liquid. That is, a large liquid pool being formed on the outer surface of the ejection part may be suppressed.

As a result, the liquid to be dispensed being absorbed into a liquid pool (i.e. dispense inhibition) and a large amount of liquid being unnecessarily dispensed from the liquid pool (i.e. dripping) may both be suppressed.

According to the present invention, the ejection part of the nozzle head is formed in a hemispherical shape. That is, the outer surface of the ejection part has the shape of a convex curved plane (more specifically the shape of a spherical surface) as a whole. Moreover, the opening of the ejection part is formed at the top of the hemisphere. Accordingly, even if liquid is splashed back to anywhere on the outer surface of the ejection part, the splashed liquid smoothly flows down along the outer surface of the ejection part and is dispensed downward together with the liquid ejected through the opening. That is, a large liquid pool being formed on the outer surface of the ejection part may further be suppressed. Moreover, the hemispherical ejection part has a simple shape, which makes it easy to manufacture the nozzle head.

According to the present invention, the support part of the liquid dispensing device supports the nozzle head through the spacer. Thus, compared to the case where the support part directly supports the flow passage part without the intermediary of a spacer, the arrangement position of the flow passage part and thus the arrangement position of the ejection part protruding from the flow passage part are higher. The position of detecting liquid by the detection part is usually located below the ejection part. If the support part directly supports the flow passage part without the intermediary of a spacer, even in a case where the ejection part interferes with the position of detecting liquid by the detection part, detection of liquid by the detection part cannot be inhibited by the ejection part as long as the arrangement position of the ejection part is made high.

Therefore, in the case where the conventional liquid dispensing device including the detection part and the support part which directly supports the flow passage part of the conventional nozzle head without the intermediary of a spacer is available, the structure of such a conventional liquid dispensing device may be utilized without a significant change to easily obtain the liquid dispensing device according to the present invention. As a result, the manufacturing cost for the liquid dispensing device according to the present invention may be reduced.

According to the nozzle head and liquid dispensing device of the present invention, a large liquid pool being formed on the outer surface of the ejection part of the nozzle head may be suppressed. This can suppress both dispense inhibition and dripping. In other words, liquid may appropriately be dispensed from the nozzle head. Accordingly, the occurrence of manufacturing defects caused by insufficient or excessive liquid dispensing may be suppressed.

The above and further objects and features will more fully be apparent from the following detailed description with accompanying drawings.

DETAILED DESCRIPTION

In the following passages, the present invention will be described in detail with reference to the drawings illustrating the embodiments thereof. In the following description, upper/lower, front/back and left/right indicated by the arrows in the drawings are used.

In the present embodiment, a liquid crystal dispensing device is illustrated as a liquid dispensing device. However, liquid to be dispensed by the liquid dispensing device is not limited to liquid crystal.

Embodiment 1

Figure 1:
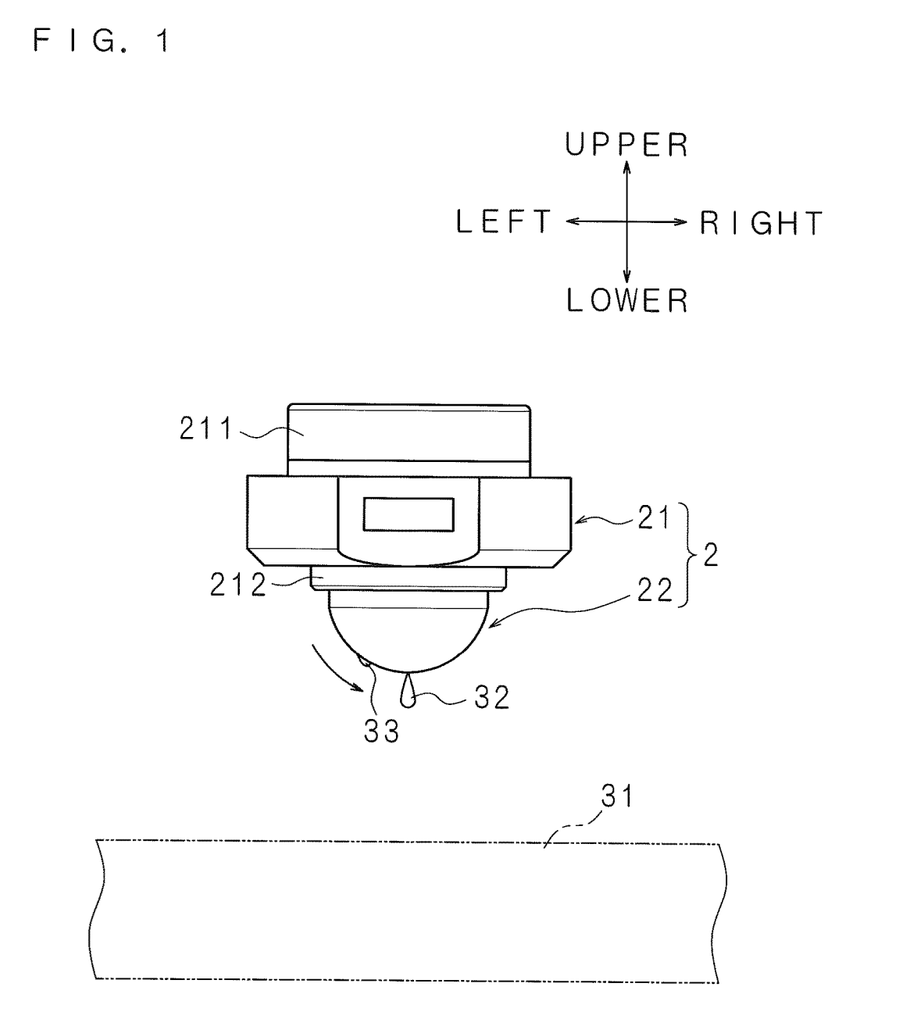
FIG. 1 is a front view illustrating the outer appearance of a nozzle head according to Embodiment 1 of the present invention.

FIG. 1 is a front view illustrating the outer appearance of a nozzle head 2 according to Embodiment 1 of the present invention.

Figure 2:
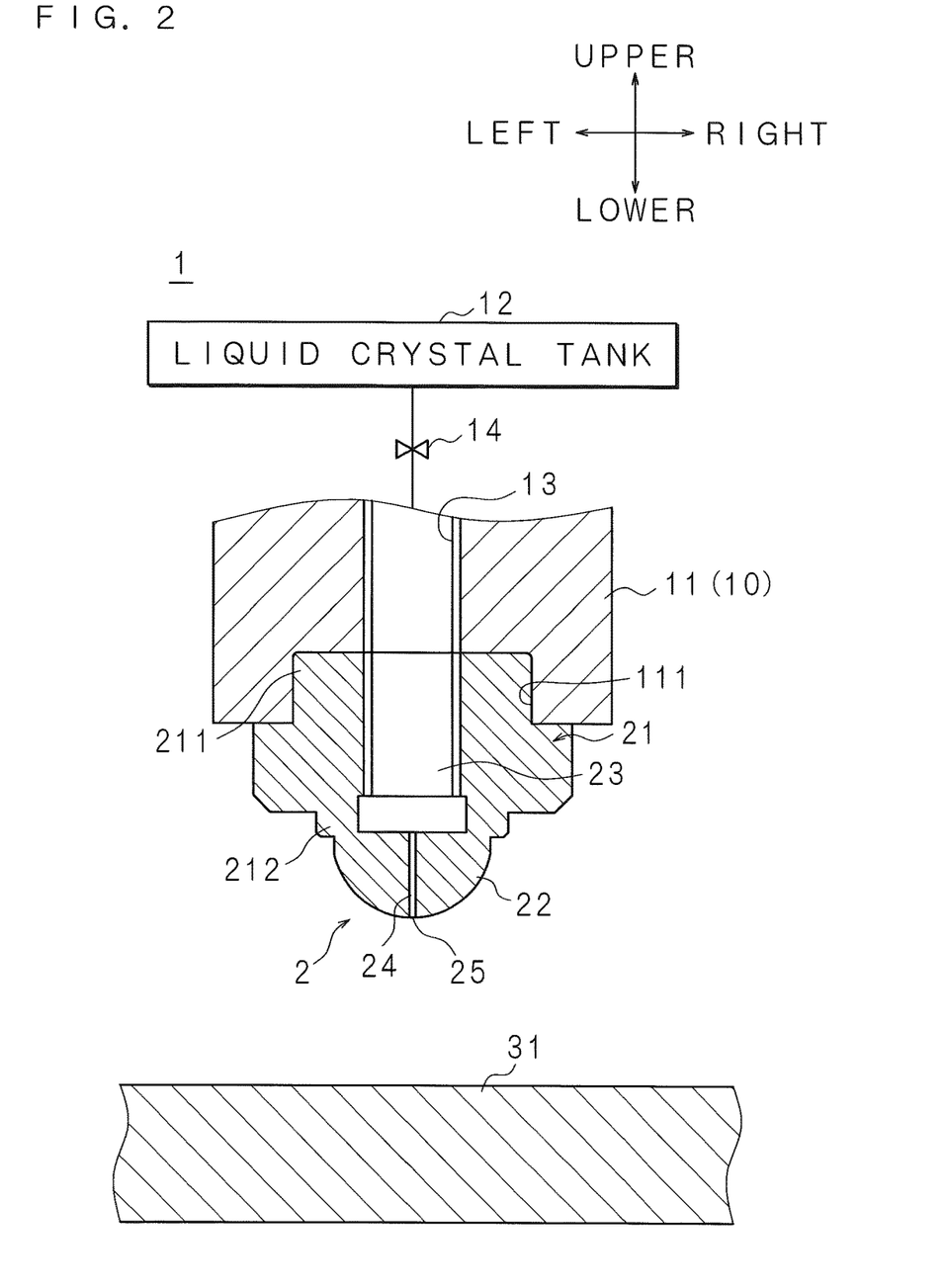
FIG. 2 is a schematic view illustrating the structure of a liquid crystal dispensing device as a liquid dispensing device according to Embodiment 1 of the present invention.

FIG. 2 is a schematic view illustrating the structure of a liquid crystal dispensing device 1 as a liquid dispensing device according to Embodiment 1 of the present invention. FIG. 2 includes a section view illustrating the internal structure of the nozzle head 2.

The reference numeral 31 in the drawings represents a glass substrate. The glass substrate 31 has a translucency. One surface of the glass substrate 31 is provided with a light shielding layer in the form of a matrix (not illustrated). Moreover, a region on one surface of the glass substrate 31, which is to be a display screen of a liquid crystal display panel, is provided with a color filter (not illustrated). Furthermore, a circumferential part of a region on one surface of the glass substrate 31, which is to be a display screen of a liquid crystal display panel, is provided with a seal material (not illustrated).

The glass substrate 31 is set to the liquid crystal dispensing device 1 in a horizontal posture with one surface thereof facing upward. In the description below, the region surrounded by the seal material on one surface of the glass substrate 31 is referred to as a dispense surface of the glass substrate 31.

Next, the structure of the main part of the liquid crystal dispensing device 1 is described. The liquid crystal dispensing device 1 includes a casing 10. In the casing 10, multiple nozzle attachment units 11, 11, . . . (only one is illustrated in FIG. 2) are arranged side by side. The nozzle attachment units 11, 11, . . . have similar structures. Each nozzle attachment unit 11 is provided with a female screw part 111 opened facing downward. A male screw part 211 described later is detachably screwed into the female screw part 111. As a result, the nozzle head 2 is detachably attached to the nozzle attachment unit 11. When the nozzle head 2 is attached to the nozzle attachment unit 11, an opening 25, which will be described later, faces downward. In the case of dispensing liquid crystal, the position for dispensing liquid crystal to the dispense surface on the glass substrate 31 is arranged to face an ejection part 22, which will be described later, below the nozzle head 2 attached to the nozzle attachment part 11.

The nozzle head 2 includes a flow passage part 21 and an ejection part 22. The flow passage part 21 is formed in a tubular shape with a vertical posture. The male screw part 211 having a cylindrical shape in a vertical posture is integrally formed with and protrudes from the upper part of the flow passage part 21. A protruding part 212 having a cylindrical shape in a vertical posture is integrally formed at the lower part of the flow passage part 21. The inside of the flow passage part 21 including the male screw part 211 and the protruding part 212 serves as a first flow path 23 in the vertical direction. The upper/lower sides of the first flow path 23 correspond to the upper/lower stream sides in the flowing direction of liquid crystal. By the male screw part 211 being screwed into the female screw part 111 of the nozzle attachment part 11, the upper stream end of the first flow path 23 is connected to the lower stream end of the flow path 13, which will be described later, in a fluid-tight manner.

The ejection part 22 having a hemispherical shape protrudes downward (i.e. protrudes in a posture where an opening 25 described next faces the lower side) from the protruding part 212 of the flow passage part 21. At the top of the hemisphere in the ejection part 22, the opening 25 is formed. That is, the outer surface of the ejection part 22 is formed in the shape of a convex curved plane (more specifically, the shape of a convex spherical surface) with the lowermost end thereof being the opening end of the opening 25.

The second flow path 24 in the vertical direction is provided inside the ejection part 22. The upper/lower sides of the second flow path 24 correspond to the upper/lower stream sides in the flow direction of liquid crystal. The second flow path 24 is thinner than the first flow path 23 of the flow passage part 21. The upper stream end of the second flow path 24 continues to the lower stream end of the first flow path 23. The opening 25 is located at the lowermost stream end of the second flow path 24.

The casing 10 of the liquid crystal dispensing device 1 supports a liquid crystal tank 12. Liquid crystal is stored in the liquid crystal tank 12. The casing 10 is provided with a flow path 13 through which liquid crystal flows. The upper stream end of the flow path 13 is connected to the liquid crystal tank 12. The lower stream end of the flow path 13 is located at the nozzle attachment part 11. As described earlier, when the nozzle head 2 is attached to the nozzle attachment part 11, the flow path 13 is connected to the first flow path 23 of the nozzle head 2. In the midway of the flow path 13, an electromagnetic valve 14 is disposed. Opening/closing of the electromagnetic valve 14 is controlled by a control unit (not illustrated). The liquid crystal stored in the liquid crystal tank 12 is pumped to the flow path 13 with a pump (not illustrated).

In the case where the electromagnetic bulb 14 is open, the pumped liquid crystal passes through the flow path 13, the first flow path 23 and the second flow path 24 in this order. The electromagnetic bulb 14 is closed at an appropriate timing. Thus, a predetermined amount of liquid crystal droplets 32 in the shape of droplets are ejected through the opening 25 one by one.

The liquid crystal droplets 32, 32 . . . ejected from the nozzle heads 2, 2, . . . are dispensed onto the dispense surface of the glass substrate 31. After completing the liquid crystal dispense processing as described above, the glass substrate 31 taken out from the liquid crystal dispensing device 1 is pasted to the glass substrate with one surface provided with a thin-film transistor, a scanning electrode and the like, to form a substrate for display panel (these components are not illustrated). Using the substrate for display panel, a liquid crystal display panel (not illustrated) is manufactured.

Figure 3:
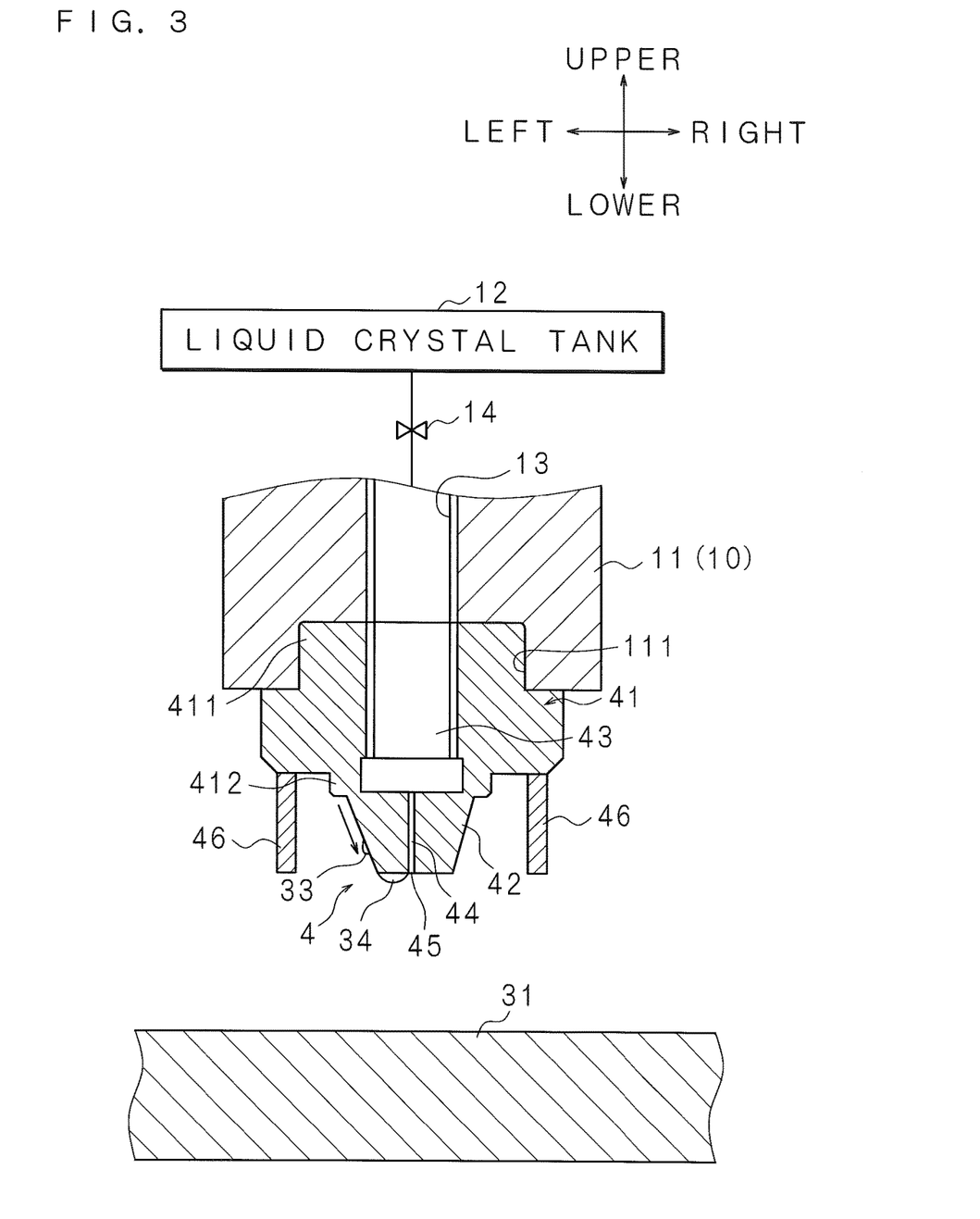
FIG. 3 is a schematic view illustrating the structure of the conventional liquid crystal dispensing device.

Next, the difference between the nozzle head 2 according to the present embodiment and the later-mentioned conventional nozzle head 4 will be described. FIG. 3 is a schematic view illustrating the structure of the conventional liquid crystal dispensing device. The structure of the conventional liquid crystal dispensing device is similar to the liquid crystal dispensing device 1 according to the present embodiment except that a nozzle head 4 is detachably attached. A flow passage part 41 of the nozzle head 4, a male screw part 411, a protruding part 412 and a first flow path 43 have structures similar to the flow passage part 21 of the nozzle head 2, the male screw part 211, the protruding part 212 and the first flow path 23.

An ejection part 42 having a frustoconical shape protrudes downward from the protruding part 412 of the flow passage part 41. An opening 45 corresponding to the opening 25 of the nozzle head 2 is formed at the lower end surface of the ejection part 42. The lower end surface of the ejection part 42 has a planar shape in a horizontal posture. The circumferential surface of the ejection part 42 is formed in a tapered shape. Inside the ejection part 42, the second flow path 44 corresponding to the second flow path 24 of the nozzle head 2 is provided. At the lower part of the ejection part 42, at least three protruding parts 46, 46, . . . each having a columnar shape are located at the lower part of the ejection part 42. The position at the lowermost end of each protruding part 46 is lower than the position at the lowermost end of the ejection part 42. The protruding parts 46, 46 . . . are arranged with equal distances between each other in the circumferential direction of the ejection part 42. The protruding parts 46, 46 . . . serve as legs of the nozzle head 4 when the nozzle head 4 is removed from the nozzle attachment part 11. Thus, in the case where, for example, the nozzle head 4 is accommodated in a storage element (not illustrated), the lower end surface of the ejection part 42 is suppressed to be in contact with an external object.

Next, a case where the nozzle head 2 or nozzle head 4 dispenses the liquid crystal droplet 32 will be described. Most of the liquid crystal droplets 32 are adhered to the dispense surface of the glass substrate 31 at the position where the liquid crystal is dispensed. A part of the liquid crystal droplets 32 may, however, be splashed back to the nozzle head 2 or the nozzle head 4 from the dispense surface of the glass substrate 31. In the description below, a part of the liquid crystal droplet 32 which is splashed back is referred to as a liquid crystal droplet 33. The liquid crystal droplet 33 has the shape of a liquid droplet which is finer than the liquid crystal droplet 32.

First, the case with the nozzle head 4 is described. The liquid crystal droplet 33 splashed back to the lower end surface of the ejection part 42 is adhered to the lower end surface of the ejection part 42. The liquid crystal droplet 33 splashed back to the circumferential surface of the ejection part 42 is either adhered to the circumferential surface of the ejection part 42 or flows down along the circumferential surface of the ejection part 42, and is adhered to the lower end surface of the ejection part 42. Since the lower end surface of the ejection part 42 has a planar shape with a horizontal posture, the adhered liquid crystal droplet 33 is easily accumulated there. Accordingly, if the dispensing of the liquid crystal droplet 32 is repeated several times, a liquid crystal pool 34 which is made from a large number of liquid crystal droplets 33, 33, . . . bonded together is formed at the lower end surface of the ejection part 42. The liquid crystal pool 34 is often larger (that is, has a larger amount of liquid crystal) than the liquid crystal droplet 32.

Protruding parts 46, 46, . . . are disposed near the ejection part 42. Therefore, the liquid crystal droplet 33 splashed back to the nozzle head 4 may also be adhered to the protruding parts 46, 46, . . . . This makes it easier for the liquid crystal pool 34 to be formed also on the outer surface (specifically, the lower end surface) of each of the protruding parts 46, 46, . . . .

In the case where the liquid crystal pool 34 larger than the liquid crystal droplet 32 is adhered to the lower end surface (specifically, the circumferential part of the opening 45) of the ejection part 42, when a new liquid crystal droplet 32 is ejected through the opening 45, the ejected liquid crystal droplet 32 is absorbed into the liquid crystal pool 34. This causes the dispense inhibition. Moreover, in the case where the liquid crystal pool 34 is adhered to the ejection part 42 or the protruding part 46, a large amount of liquid crystal is unnecessarily dispensed from the liquid crystal pool 34 to the dispense surface of the glass substrate 31 due to, for example, its own weight of the liquid crystal pool 34 or vibration of the liquid crystal dispensing device 1. That is, dripping occurs. The dripping may increase liquid crystal to be dispensed onto the dispense surface of the glass substrate 31 by the amount of approximately ten times the liquid crystal droplet 32.

Next, the case with the nozzle head 2 is described. The liquid crystal droplet 33 splashed back to the outer surface of the ejection part 22 is either adhered to the outer surface of the ejection part 22 or smoothly flows down along the outer surface of the ejection part 22 and is adhered to the circumferential part of the opening 25. Even if the liquid crystal droplet 33 smaller than the liquid crystal droplet 32 is adhered to the circumferential part of the opening 25, when a new liquid crystal droplet 32 is ejected through the opening 25, the liquid crystal droplet 33 is absorbed into the ejected liquid crystal droplet 32. As a result, the liquid crystal droplet 32 including the liquid crystal droplet 33 is dispensed to the dispense surface of the glass substrate 31. Since the liquid crystal droplet 33 is finer compared to the liquid crystal droplet 32, no particular problem occurs even if the liquid crystal droplet 32 including the liquid crystal droplet 33 is dispensed to the dispense surface of the glass substrate 31.

Even if a multiple number of liquid crystal droplets 33, 33, . . . are bonded together at the outer surface of the ejection part 22, the outer surface of the ejection part 42 has a spherical shape, which makes it difficult for the bonded liquid crystal droplets 33, 33, . . . to be accumulated. Accordingly, it is not possible for the bonded liquid crystal droplets 33, 33, . . . to form the liquid crystal pool 34 larger than the liquid crystal droplet 32. Even if the bonded liquid crystal droplets 33, 33, . . . flow down, are adhered to the circumferential part of the opening 25, and the liquid crystal droplet 32 including the bonded liquid crystal droplets 33, 33, . . . is dispensed to the dispense surface of the glass substrate 31, the amount of liquid crystal to be dispensed to the dispense surface of the glass substrate 31 is reduced to approximately two to three times the liquid crystal droplet 32 at most. Furthermore, the nozzle head 2 is not provided with any element corresponding to the protruding parts 46, 46 of the nozzle head 4. Thus, the liquid crystal pool 34 cannot be formed at a portion other than the ejection part 22 either. As a result, with the nozzle head 2, the occurrence of both dispense inhibition and dripping are suppressed.

It is to be noted that the ejection part 22 is not limited to a hemispherical shape but may also have, for example, a semi-ellipsoidal or rotational paraboloidal shape. In this case also, the opening 25 is formed at the top of the semi-ellipsoid or rotational paraboloid. The outer surface of the ejection part 22 here has the shape of a quadratic surface such as an elliptical surface or a paraboloidal surface. This makes it difficult for the liquid crystal pool 34 to be formed on the outer surface of the ejection part 22.

Furthermore, the ejection part 22 may have a frustoconical shape with its lower end surface having a spherical shape protruding downward. In this case, the outer surface of the ejection part 22 is formed in the shape of a spherical surface across a region from the opening end to at least the circumferential part of the opening 25, which makes it more difficult for the liquid crystal pool 34 to be formed compared to the case with the nozzle head 4.

The liquid crystal dispensing device 1 and the nozzle head 2 as described above may suppress both dispense inhibition and dripping. In other words, liquid crystal may appropriately be dispensed from the nozzle head 2. This can therefore suppress the occurrence of manufacturing defects of the substrate for the display panel due to insufficient or excessive dispense of liquid crystal to the dispense surface of the glass substrate 31.

Furthermore, the liquid crystal dispensing device 1 illustrated in FIG. 2 may be obtained by changing the nozzle heads 4, 4, . . . of the conventional liquid crystal dispensing device illustrated in FIG. 3 to the nozzle heads 2, 2, . . . . That is, the liquid crystal dispensing device 1 may be configured at low cost using the conventional liquid crystal dispensing device.

It is to be noted that the outer surface of the ejection part 22 may be coated with a coating layer with liquid repellency. In such a case, the liquid crystal droplet 33 splashed back to the outer surface of the ejection part 22 more smoothly flows down along the outer surface of the ejection part 22, so as to be easily dispensed to the dispense surface of the glass substrate 31 together with a newly ejected liquid crystal droplet 32.

Embodiment 2

Figure 4:
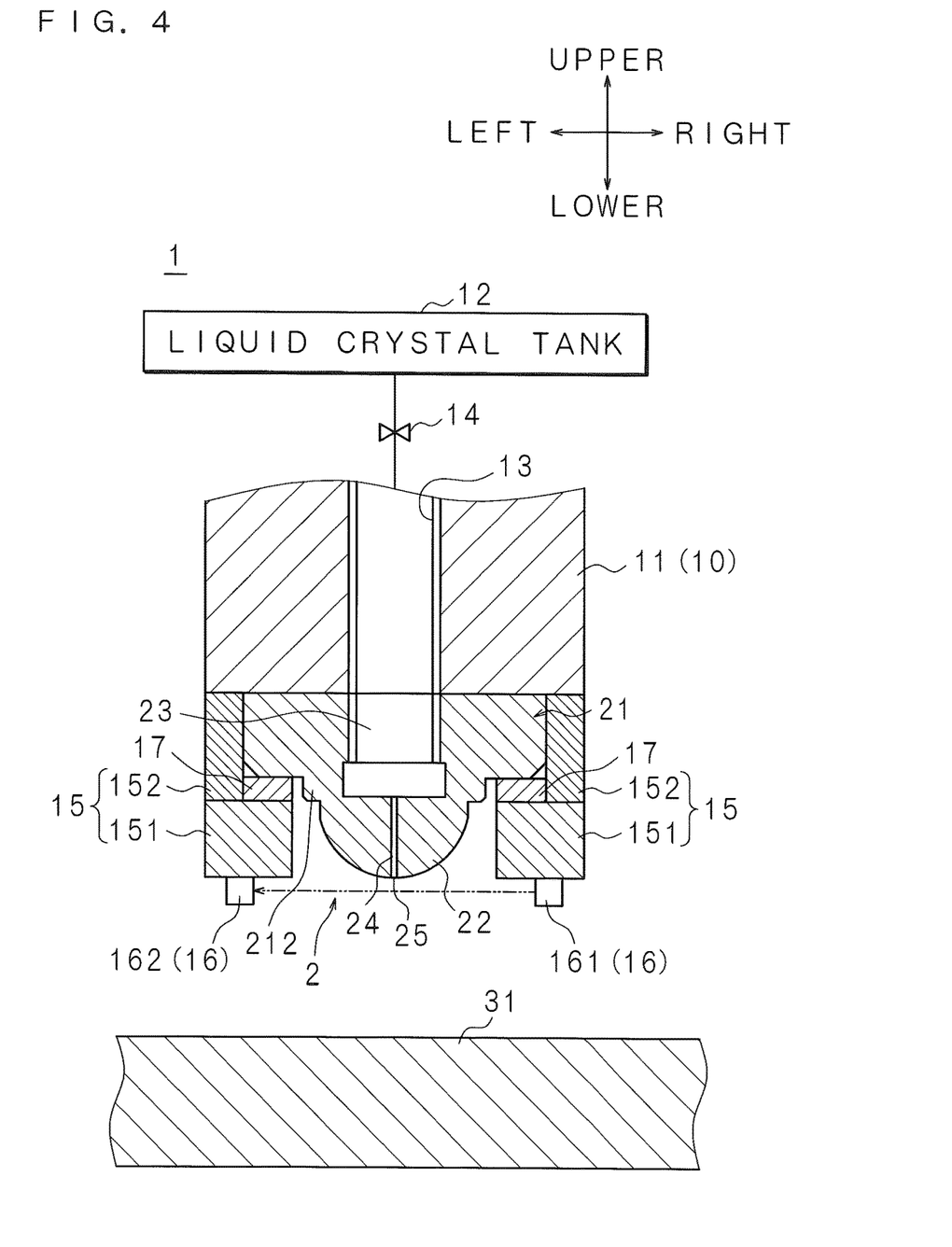
FIG. 4 is a schematic view illustrating the structure of a liquid crystal dispensing device according to Embodiment 2 of the present invention.

FIG. 4 is a schematic view illustrating the structure of a liquid crystal dispensing device 1 according to Embodiment 2 of the present invention. FIG. 4 corresponds to FIG. 2 in Embodiment 1.

The liquid crystal dispensing device 1 and nozzle head 2 according to the present embodiment have structures substantially similar to those of the liquid crystal dispensing device 1 and nozzle head 2 according to Embodiment 1. In the following passages, the difference between Embodiment 1 and the present embodiment will be described while the parts corresponding to those in Embodiment 1 will be denoted by the same reference numerals and will not be described in detail.

The flow passage part 21 of the nozzle head 2 according to the present embodiment is not provided with the male screw part 211.

The nozzle attachment part 11 of the liquid crystal dispensing device 1 according to the present embodiment is not provided with the female screw part 111.

The nozzle attachment part 11 is provided with support parts 15, 15 . . . . Each support part 15 includes a columnar support body 151 in a horizontal posture and a columnar support arm 152 in a vertical posture.

The support arms 152, 152 . . . of the support parts 15, 15 . . . are located at the casing 10 so as to surround the attachment position of the nozzle head 2 in the nozzle attachment part 11.

The support body 151 is fixed to the lower end of each support arm 152.

The flow passage part 21 of the nozzle head 2 is supported by the support bodies 151, 151 . . . of the support parts 15, 15 . . . at the lower side. Spacers 17, 17 . . . are interposed between the lower part of the flow passage part 21 and the upper part of the respective support bodies 151, 151 . . . . In other words, the flow passage part 21 is supported by the support parts 15, 15 . . . through the spacers 17, 17 . . . .

At the lower part of the support body 151 of one support part 15, a light emitting part 161 is attached, which will be described later. At the lower part of the support body 151 of another support part 15, a light receiving part 162 is attached, which will be described later.

A detection part 16 includes the light emitting part 161 and the light receiving part 162. The light emitting part 161 and the light receiving part 162 are arranged to face each other. In the description below, a middle part between the light emitting part 161 and the light receiving part 162 in the facing direction is referred to as a droplet detection position.

The droplet detection position is located directly below an area near the opening 25. Accordingly, the liquid crystal droplet 32 ejected through the opening 25 is present at the droplet detection position just before it falls downward (i.e. is dispensed) from the ejection part 22.

If the liquid crystal droplet 32 is not present at the droplet detection position, light emitted by the light emitting part 161 enters the light receiving part 162 (see the dashed-two dotted arrow illustrated in FIG. 4). That is, the light receiving part 162 receives light.

If, on the other hand, the liquid crystal droplet 32 is present at the droplet detection position, light emitted from the light emitting part 161 does not enter the light receiving part 162. That is, the light receiving part 162 does not receive light. This is because the light emitted from the light emitting part 161 is shielded or scattered by the liquid crystal droplet 32 present at the droplet detection position.

Accordingly, if the light receiving part 162 receives light at a timing when the liquid crystal droplet 32 is supposed to be present at the droplet detection position (i.e. timing at which no light is supposed to be received by the light receiving part 162), it can be found that the ejected liquid crystal droplet 32 has not been dispensed or the liquid crystal droplet 32 was not ejected in the first place. That is, it can be found that dispense inhibition has occurred for some reason.

On the other hand, if the light receiving part 162 does not receive light at a timing when no liquid crystal droplet 32 is supposed to be present at the droplet detection position (i.e. timing at which the light receiving part 162 is supposed to receive light), it can be found that a foreign substance (not illustrated) having a light shielding property or light scattering property is present at the droplet detection position. It is highly possible that this foreign substance is adhered to the outer surface of the ejection part 22 (particularly, the circumferential part of the opening 25).

The detection part 16 outputs, as a result of detection by the detection part 16, a signal indicating whether or not the light receiving part 162 has received light to a control unit (not illustrated). The control unit performs determination on whether or not dispense inhibition has occurred and determination on whether or not a foreign substance is adhered to the outer surface of the ejection part 22, based on the result of detection by the detection part 16. If it is determined that dispense inhibition has occurred or determined that a foreign substance is adhered to the outer surface of the ejection part 22, the liquid crystal dispensing device 1 reports the occurrence of abnormality to the user of the liquid crystal dispensing device 1.

Figure 5:
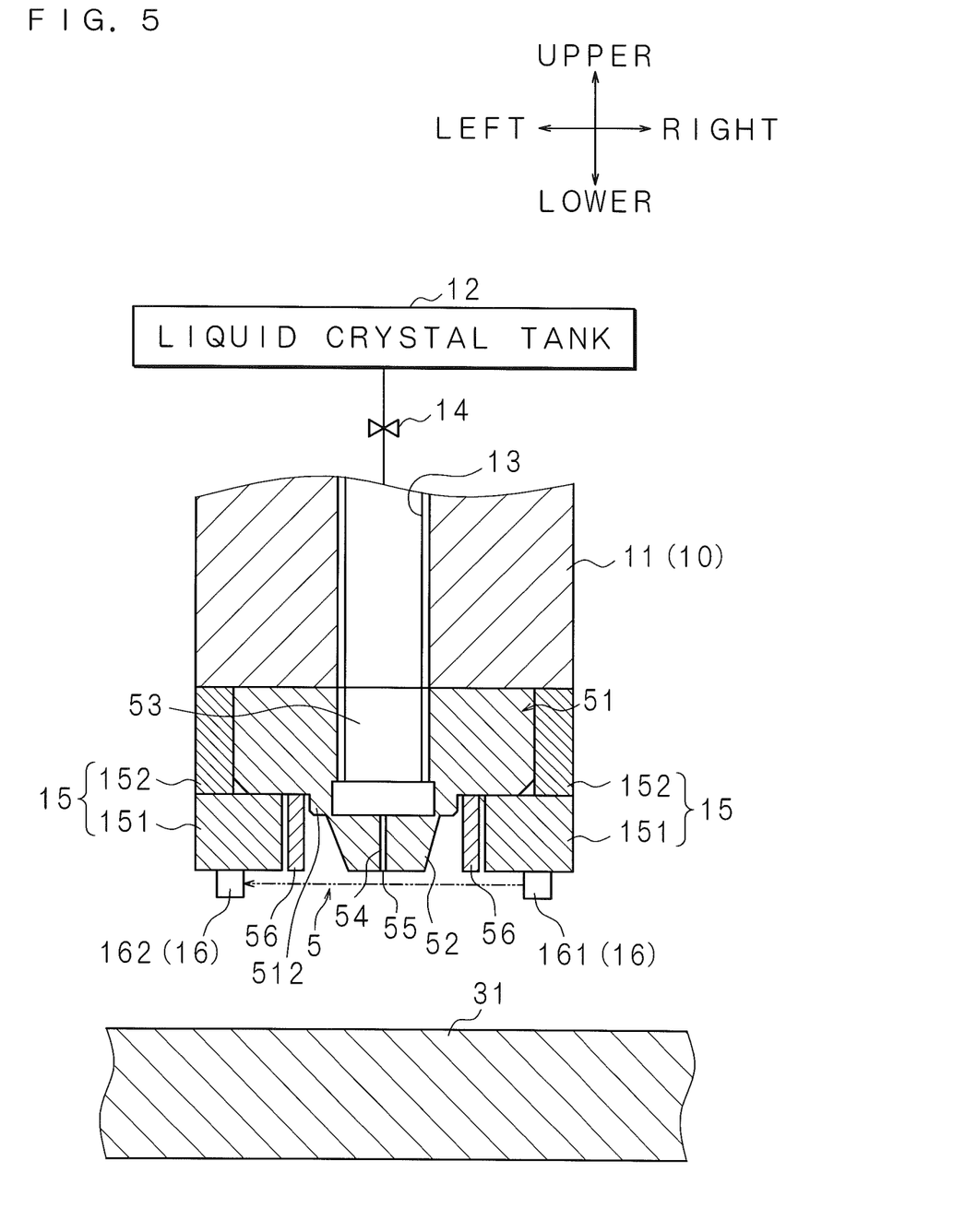
FIG. 5 is a schematic view illustrating the structure of the conventional liquid crystal dispensing device.

Here, the difference between the liquid crystal dispensing device 1 according to the present embodiment and the conventional liquid crystal dispensing device is described. FIG. 5 is a schematic view illustrating the structure of the conventional liquid crystal dispensing device.

The conventional liquid crystal dispensing device is configured similarly to the liquid crystal dispensing device 1 according to the present embodiment except that the spacers 17, 17 . . . are not provided and nozzle heads 5, 5 . . . are mounted instead of the nozzle heads 2, 2, . . . .

A flow passage part 51, a protruding part 512, an ejection part 52, a first flow path 53, a second flow path 54, an opening 55 and a protruding part 56 of the nozzle head 5 correspond to the flow passage part 41, the protruding part 412, the ejection part 42, the first flow path 43, the second flow path 44, the opening 45 and the protruding part 46 of the nozzle head 4. The nozzle head 5 is not provided with any element which corresponds to the male screw part 411 of the nozzle head 4.

The flow passage part 51 of the nozzle head 5 is supported at the lower side by the support bodies 151, 151, . . . of the support parts 15, 15 . . . . In this case, the flow passage part 51 is directly supported by the support parts 15, 15 . . . without the intermediary of the spacers 17, 17 . . . .

The droplet detection position concerning the detection part 16 is positioned directly below the area near the opening 55. Accordingly, the liquid crystal droplet 32 ejected through the opening 55 is present at the droplet detection position just before being dispensed from the ejection part 52.

The liquid crystal pool 34 is easily formed at the lower end surface of the ejection part 52. Thus, if the light receiving part 162 receives light at a timing when the liquid crystal droplet 32 is supposed to be present at the droplet detection position, it can be found that dispense inhibition has occurred for some reason (for example, by the ejected liquid crystal droplet 32 being absorbed into the liquid crystal pool 34).

On the other hand, if the light receiving part 162 does not receive light at a timing when the liquid crystal droplet 32 is not supposed to be present at the droplet detection position, it can be found that a foreign substance with a light shielding or light scattering property (for example, the liquid crystal pool 34 adhered to the lower end surface of the ejection part 52), which is not illustrated, is present at the droplet detection position.

The flow passage part 21 of the nozzle head 2 is shorter in the vertical length than the flow passage part 51 of the nozzle head 5. Hence, in order for the support parts 15, 15 . . . to support the flow passage part 21, the spacers 17, 17 . . . are needed. If the vertical length of the flow passage part 21 of the nozzle head 2 is approximately the same as the vertical length of the flow passage part 51 of the nozzle head 5, the need for the spacers 17, 17, . . . is eliminated, while the lower end portion of the ejection part 22 may inconveniently be located at the droplet detection position. If the vertical length of the ejection part 22 is shortened to resolve such inconvenience, the second flow path 24 is unnecessarily shortened, which cannot enhance the accuracy of dispensing the liquid crystal droplet 32.

The liquid crystal dispensing device 1 as illustrated in FIG. 4 may be obtained by adding the spacers 17, 17 . . . to the conventional liquid crystal dispensing device illustrated in FIG. 5 and by replacing the nozzle heads 5, 5, . . . with the nozzle heads 2, 2, . . . . That is, the liquid crystal dispensing device 1 may be formed at low cost by utilizing the conventional liquid crystal dispensing device.

It is to be noted that the spacers 17, 17, . . . are not limited to the structure of being integrally formed with the support parts 15, 15, . . . , but may have a structure of being integrally formed with the flow passage part 21 of the nozzle head 2.

Embodiment 3

Figure 6:
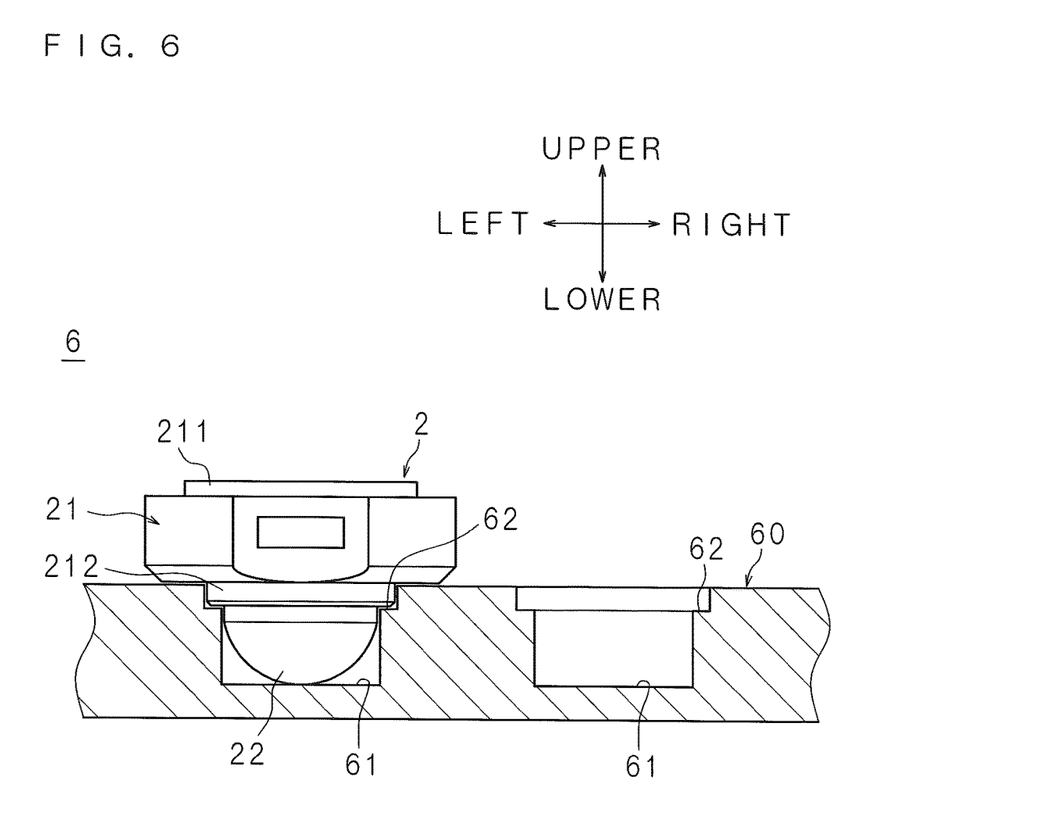
FIG. 6 is a section view illustrating the structure of a storage element storing a nozzle head according to Embodiment 3 of the present invention.

FIG. 6 is a section view illustrating the structure of a storage element 6 storing a nozzle head 2 according to Embodiment 3 of the present invention.

The liquid crystal dispensing device 1 and the nozzle head 2 according to the present embodiment have structures similar to those of the liquid crystal dispensing device 1 and the nozzle head 2 according to Embodiment 1. In the following passages, the difference between Embodiment 1 and the present embodiment will be described while the parts corresponding to those in Embodiment 1 will be denoted by the same reference numerals and will not be described in detail.

The conventional nozzle head 4 may be mounted on a table, for example, by using the protruding parts 46, 46, . . . as legs. Moreover, the protruding parts 46, 46, . . . suppress damages due to the outer surface of the ejection part 42 being in contact with a foreign substance.

On the other hand, the nozzle head 2 is not provided with any element which corresponds to the protruding parts 46, 46, . . . of the nozzle head 4. If the outer surface of the ejection part 22 is damaged, irregularity is generated on the outer surface of the ejection part 22, which makes it easier for the liquid crystal pool 34 to be formed at the damaged portion.

Here, in order to store the nozzle head 2 removed from the nozzle attachment part 11, a storage element 6 is used.

The storage element 6 has a main body 60 having the shape of a flat plate. On the upper surface of the main body 60, multiple circular insertion holes 61, 61 . . . are formed. The insertion holes 61, 61 . . . on the upper surface of the main body 60 may be arranged either in a staggered manner or a grid manner. Each insertion hole 61 does not penetrate the main body 60. The depth of the insertion hole 61 is longer than the length with which the ejection part 22 protrudes from the lower surface of the flow passage part 21 excluding the protrusion part 212. The inner diameter of the insertion hole 61 is longer than the diameter of the ejection part 22, but is shorter than any of the maximum length of the flow passage part 21 in the left-to-right direction and the maximum length thereof in the front-to-back direction.

A concave step part 62 is formed at the circumferential part of the insertion hole 61. The depth and inner diameter of the step part 62 corresponds to the vertical length and the outer diameter of the protruding part 212.

The user of the storage element 6 inserts the ejection part 22 of the nozzle head 2 into the insertion hole 61. Here, the protruding part 212 of the nozzle head 2 is fitted to the step part 62, while the lower surface of the flow passage part 21 excluding the protruding part 212 makes contact with the upper surface of the main body 60. As such, the nozzle head 2 is positioned with respect to the storage element 6. Here, the ejection part 22 is separated from any of the inner circumferential surface and the bottom surface of the insertion hole 61. That is, the nozzle head 2 is stored in the storage element 6 in the state where the ejection part 22 is not in contact with the main body 60.

By the main body 60 being mounted on a table, for example, the nozzle head 2 stored in the storage element 6 may indirectly be mounted on the table. Moreover, the storage element 6 suppresses damages which may be caused on the outer surface of the ejection part 22 due to a foreign substance being in contact with the ejection part 22. In this case, the contact between the storage element 6 itself with the ejection part 22 is also suppressed.

It is to be noted that a shock-absorbing material for protecting the ejection part 22 may be arranged inside the insertion hole 61.

The embodiments disclosed herein are to be construed as illustrative and not restrictive in all aspects. The scope of the invention is defined by the appended claims rather than by the description preceding them, and all changes that fall within metes and bounds of the claims, or equivalence of such metes and bounds thereof are therefore intended to be embraced by the claims.

Furthermore, as long as the effects of the present invention may be obtained, the liquid crystal dispensing device 1 or the nozzle head 2 may also include any component not disclosed in Embodiments 1 to 3.

The components (technical features) disclosed in the embodiments can be combined with one another, while the combination thereof can form a new technical feature.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A liquid dropping device, comprising:
    a nozzle head;
    a nozzle attachment to which the nozzle head is attached;
    a flow path for allowing liquid to pass through, a downstream end of the flow path being located at the nozzle attachment;
    a valve disposed in a midway of the flow path; and
    a controller controlling opening/closing of the valve so as to discharge liquid from an opening of the nozzle head in a shape of droplets one by one,
    wherein the nozzle head comprises:
    a flow passage having a first flow path therein; and
    an ejector having a second flow path therein, wherein
    an upstream end of the first flow path provided in the flow passage is connected to the downstream end of the flow path in the nozzle attachment,
    an upstream end of the second flow path thinner than the first flow path provided in the ejector is connected to a downstream end of the first flow path,
    the second flow path is provided with the opening at a downstream end thereof,
    the ejector is formed in a shape of a hemisphere protruding from the flow passage such that liquid splashed back on an outer surface of the ejector flows down along the outer surface of the ejector and is dispensed with the liquid ejected through the opening, and
    the second flow path is thinner than the first flow path and occupies substantially the entire length of the hemisphere-shaped ejector.

2. The liquid dropping device according to claim 1, further comprising: a detector detecting liquid ejected from the ejector of the nozzle head; and a support supporting the flow passage at a lower side through a spacer, wherein the ejector is formed at and protrudes from the flow passage.

3. The liquid dropping device according to claim 1, wherein
the lowermost stream end of the flow path is connected to the upstream end of the first flow path by screwing the flow passage of the nozzle head into a female screw part defining an opening of the nozzle attachment.

4. The liquid dropping device according to claim 3, wherein
the opening of the nozzle head is at a lowermost end of the liquid dropping device by screwing the flow passage of the nozzle head into the female screw part of the nozzle attachment.

5. The liquid dropping device according to claim 1, further comprising a tank storing liquid, the tank being connected to an upstream end of the flow path.

6. The liquid dropping device according to claim 1, wherein the valve is an electromagnetic valve.

7. The liquid dropping device according to claim 1, wherein the outer surface of the ejector is coated by a layer with liquid repellency.

* * * * *